(12) United States Patent
Ryu et al.

(10) Patent No.: US 9,919,937 B2
(45) Date of Patent: Mar. 20, 2018

(54) SYSTEM FOR RECOVERING MULTIPLE KINDS OF IONS

(71) Applicant: KOREA INSTITUTE OF GEOSCIENCE AND MINERAL RESOURCES (KIGAM), Daejeon (KR)

(72) Inventors: Tae Gong Ryu, Daejeon (KR); Byoung Gyu Kim, Daejeon (KR); Jung Ho Ryu, Daejeon (KR); In Su Park, Chungcheongnam-do (KR); Hye Jin Hong, Daejeon (KR); Kang Sup Chung, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 112 days.

(21) Appl. No.: 15/074,731

(22) Filed: Mar. 18, 2016

(65) Prior Publication Data
US 2017/0044032 A1    Feb. 16, 2017

(30) Foreign Application Priority Data
Aug. 13, 2015 (KR) .................. 10-2015-0114333

(51) Int. Cl.
*C02F 1/469*      (2006.01)
*C02F 1/46*       (2006.01)
(Continued)

(52) U.S. Cl.
CPC .......... *C02F 1/4691* (2013.01); *C02F 1/4604* (2013.01); *C02F 1/283* (2013.01); *C02F 1/42* (2013.01); *C02F 2201/4618* (2013.01)

(58) Field of Classification Search
CPC ............................ C02F 1/4691; B01D 61/50
See application file for complete search history.

(56) References Cited

U.S. PATENT DOCUMENTS 9,085,971 B2 *    7/2015   Janssen ................... E21B 43/20
2013/0153426 A1 * 6/2013   Sun ........................ C02F 1/4691
                                                         204/638
(Continued)

FOREIGN PATENT DOCUMENTS

JP         56-93992 B2      4/2015
KR      10-1136816 B1       4/2012
(Continued)

*Primary Examiner* — Bryan D. Ripa
(74) *Attorney, Agent, or Firm* — Marshall, Gerstein & Borun LLP

(57) ABSTRACT

The present disclosure relates to a system for recovering multiple kinds of ions, which includes: an ion adsorption tank that includes a plurality of adsorption channels arranged in parallel and including a first electrode unit electrically adsorbing only negative ions and a second electrode unit having an adsorbent layer for adsorbing positive ions to be recovered from positive ions, in which electricity is independently supplied to the adsorption channels; a water tank that keeps liquid discharged from the ion adsorption tank; a pump that circulates mother liquor or liquid stored in the water tank; and an ion recovering tank that keeps liquid containing positive ions to be recovered. According to the present disclosure, a series of processes make it possible to continuously recover ions to be recovered, so the operation efficiency of the system can be maximized.

6 Claims, 14 Drawing Sheets

(51) Int. Cl.
*C02F 1/28* (2006.01)
*C02F 1/42* (2006.01)

(56) References Cited

U.S. PATENT DOCUMENTS

2014/0158527 A1* 6/2014 Chung ................ C02F 1/46109
 204/263
2016/0060777 A1* 3/2016 Chung ...................... C25C 1/02
 205/771

FOREIGN PATENT DOCUMENTS

KR 10-1335364 B1 12/2013
KR 10-1442143 B1 9/2014

* cited by examiner

[FIG. 1]
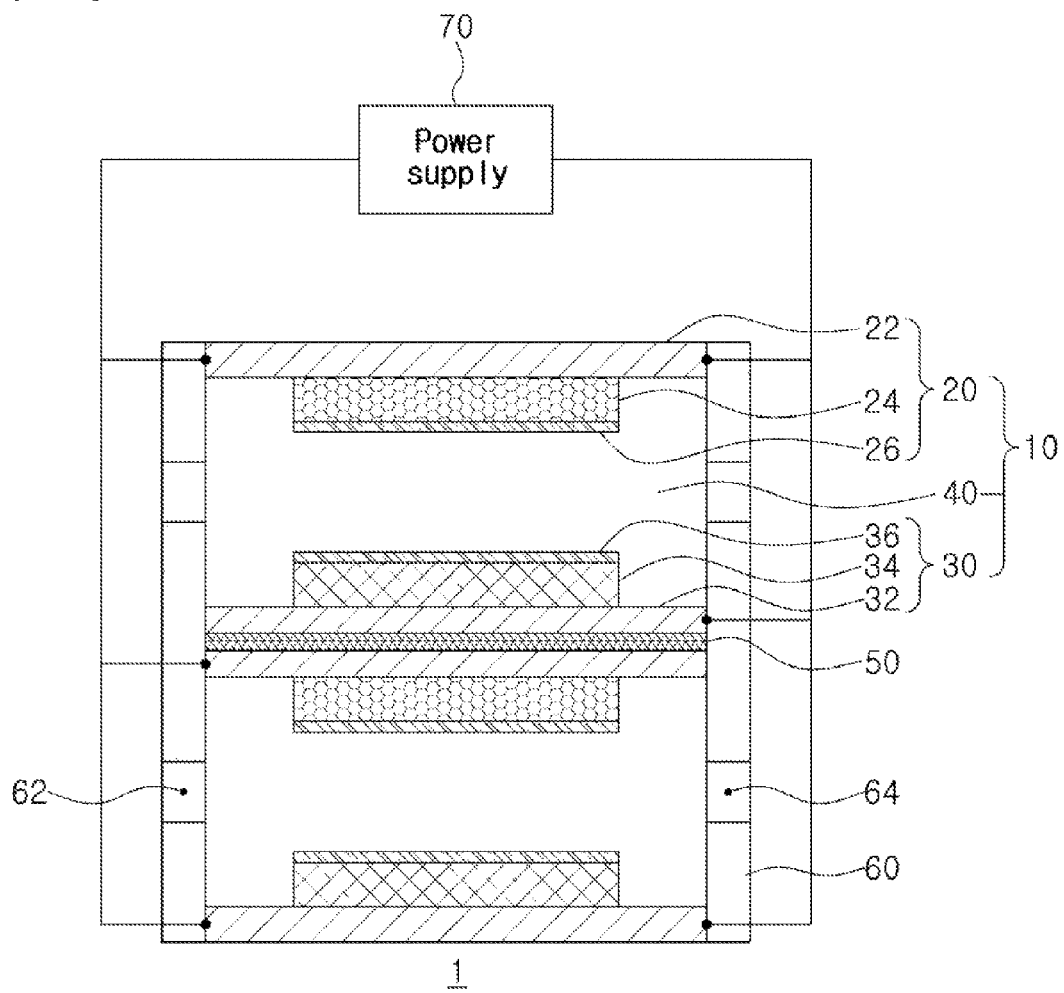

[FIG. 2]
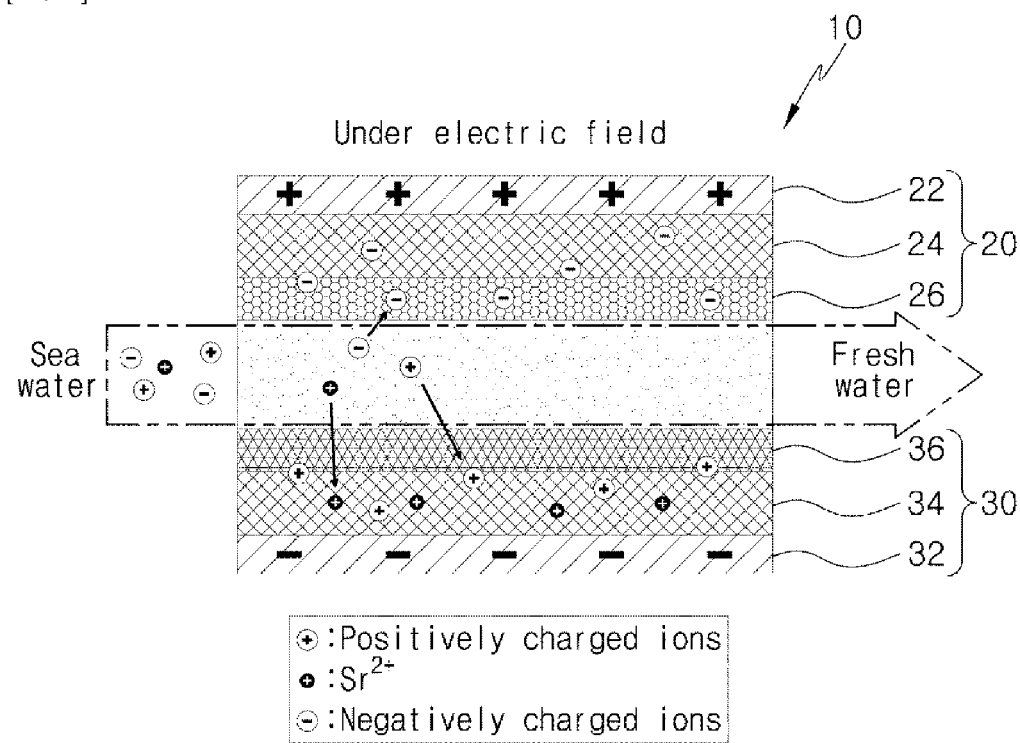

[FIG. 3]
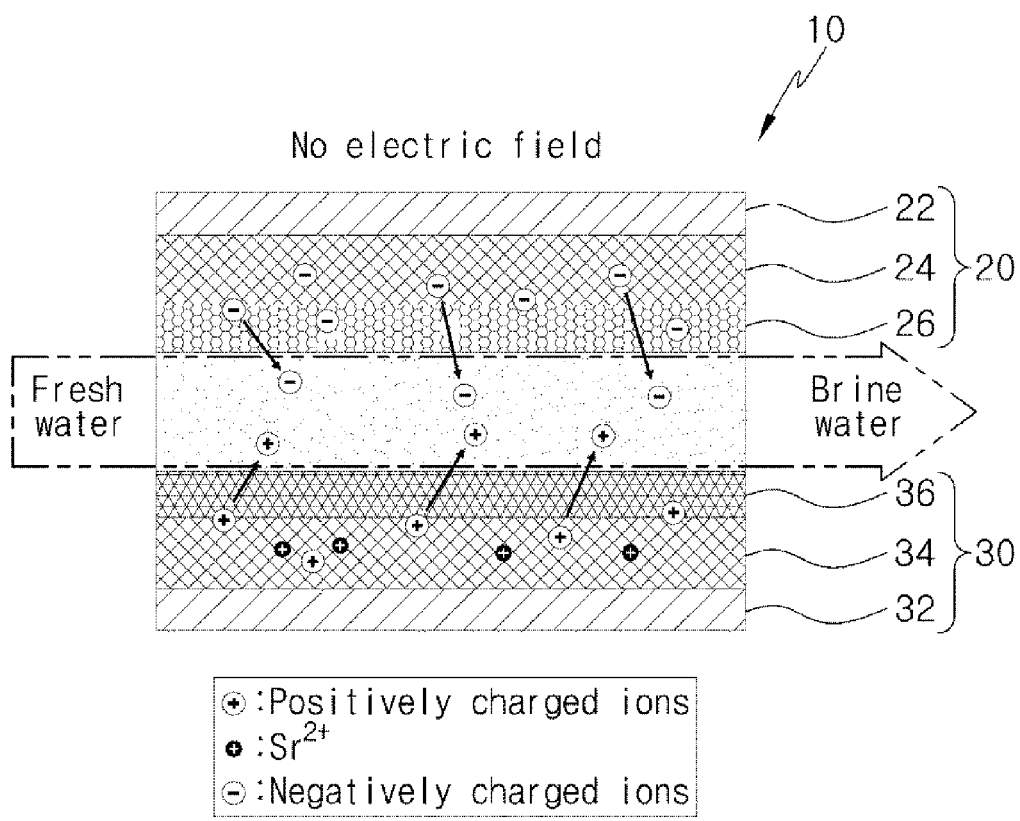

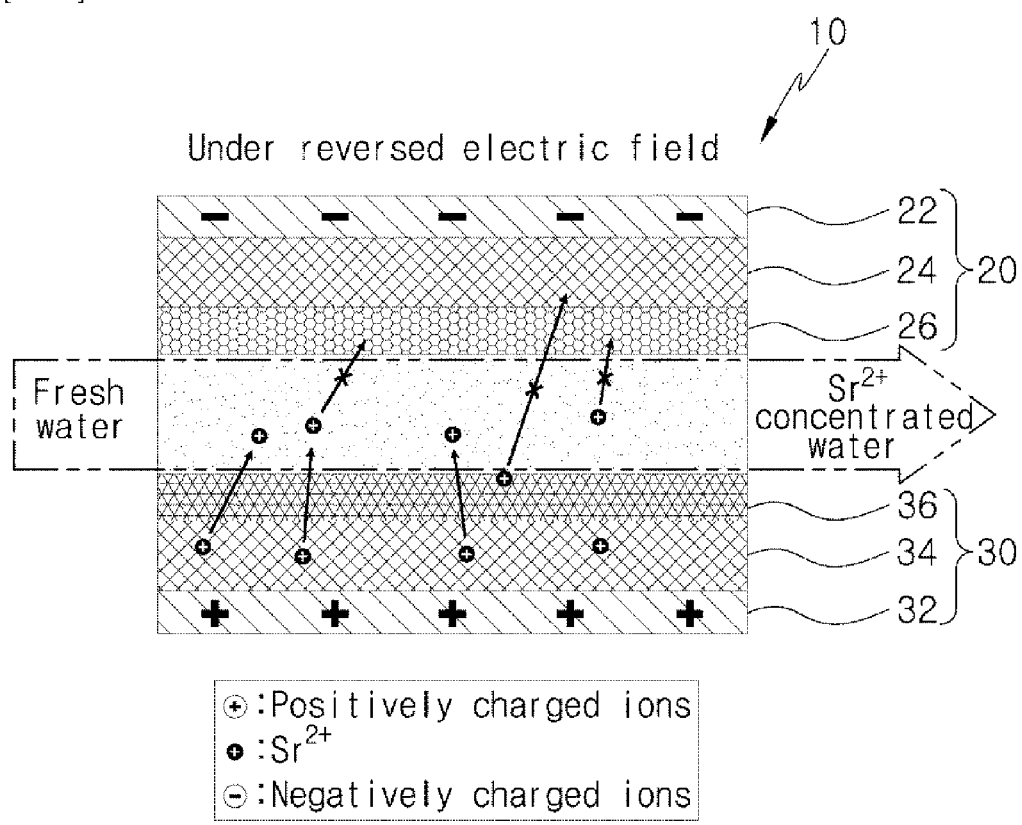
[FIG. 4]

[FIG. 5]
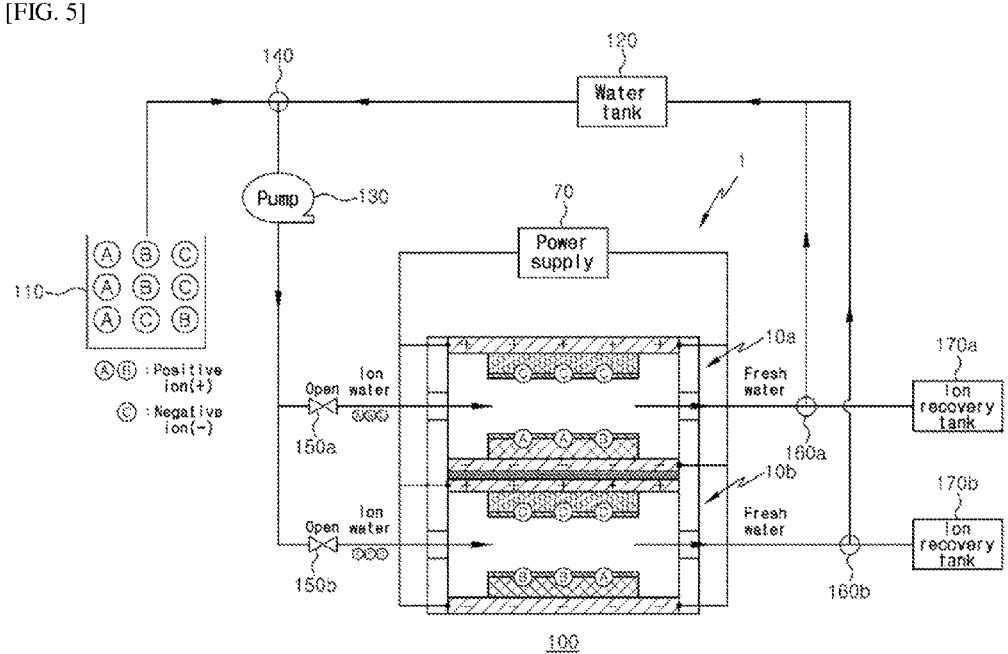

[FIG. 6]
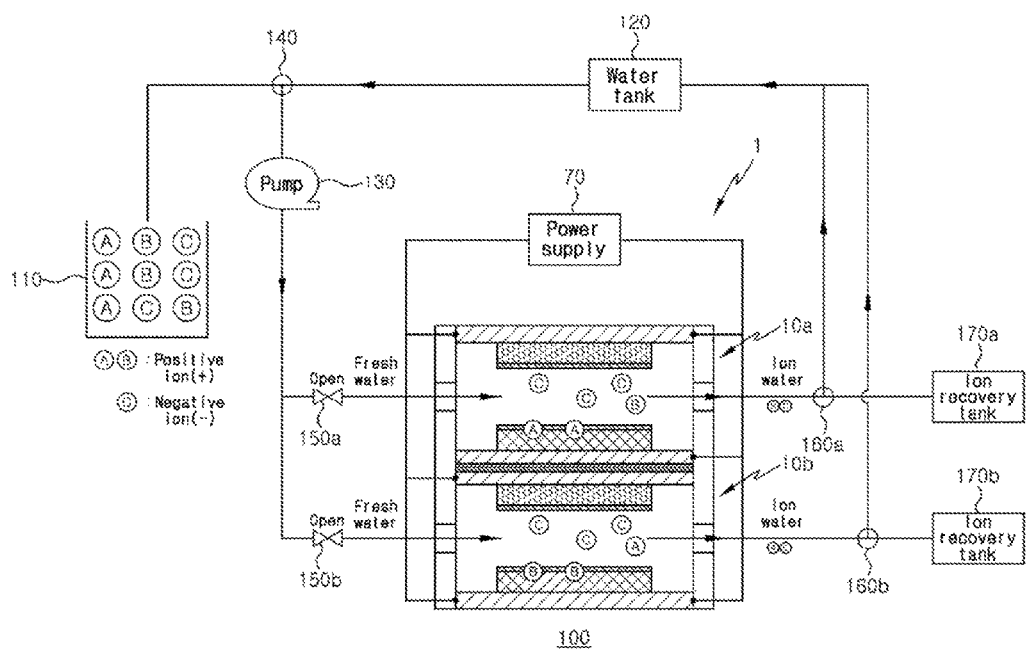

[FIG. 7]
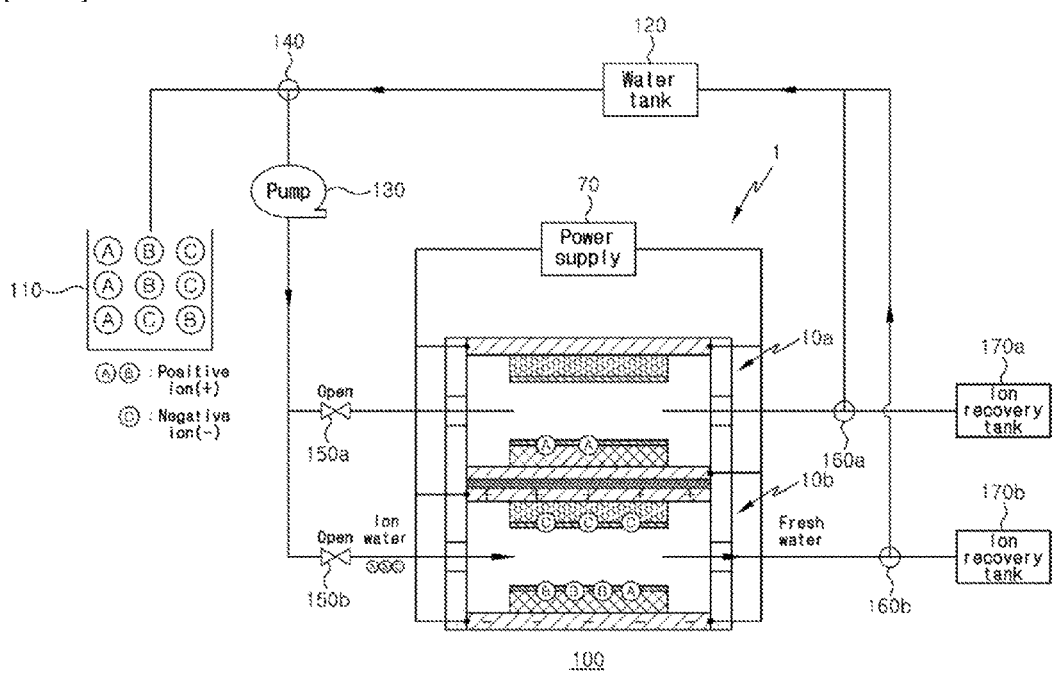

[FIG. 8]
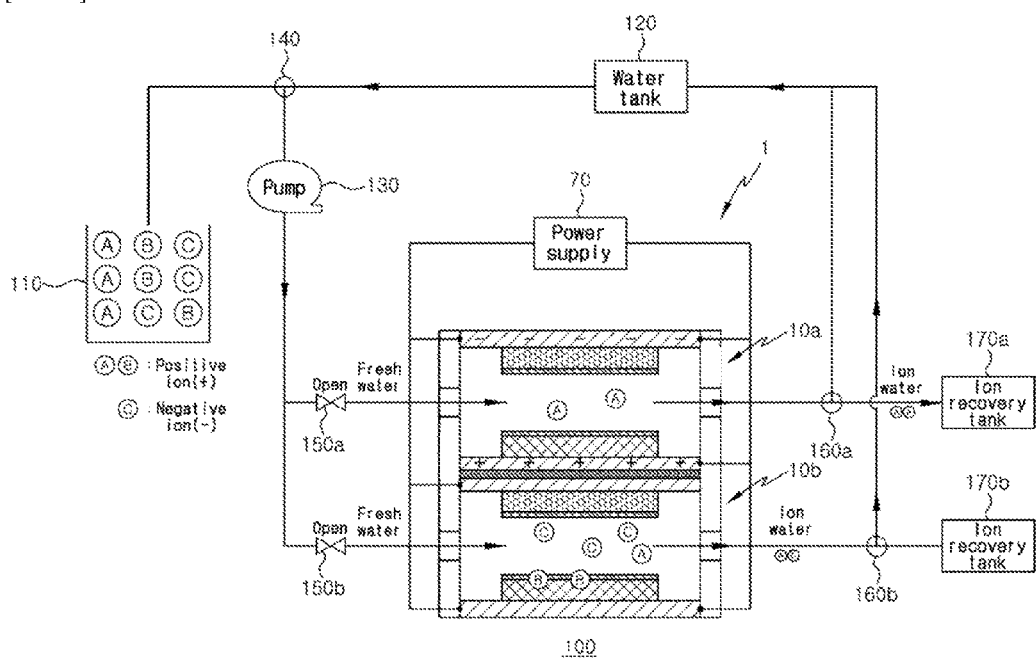

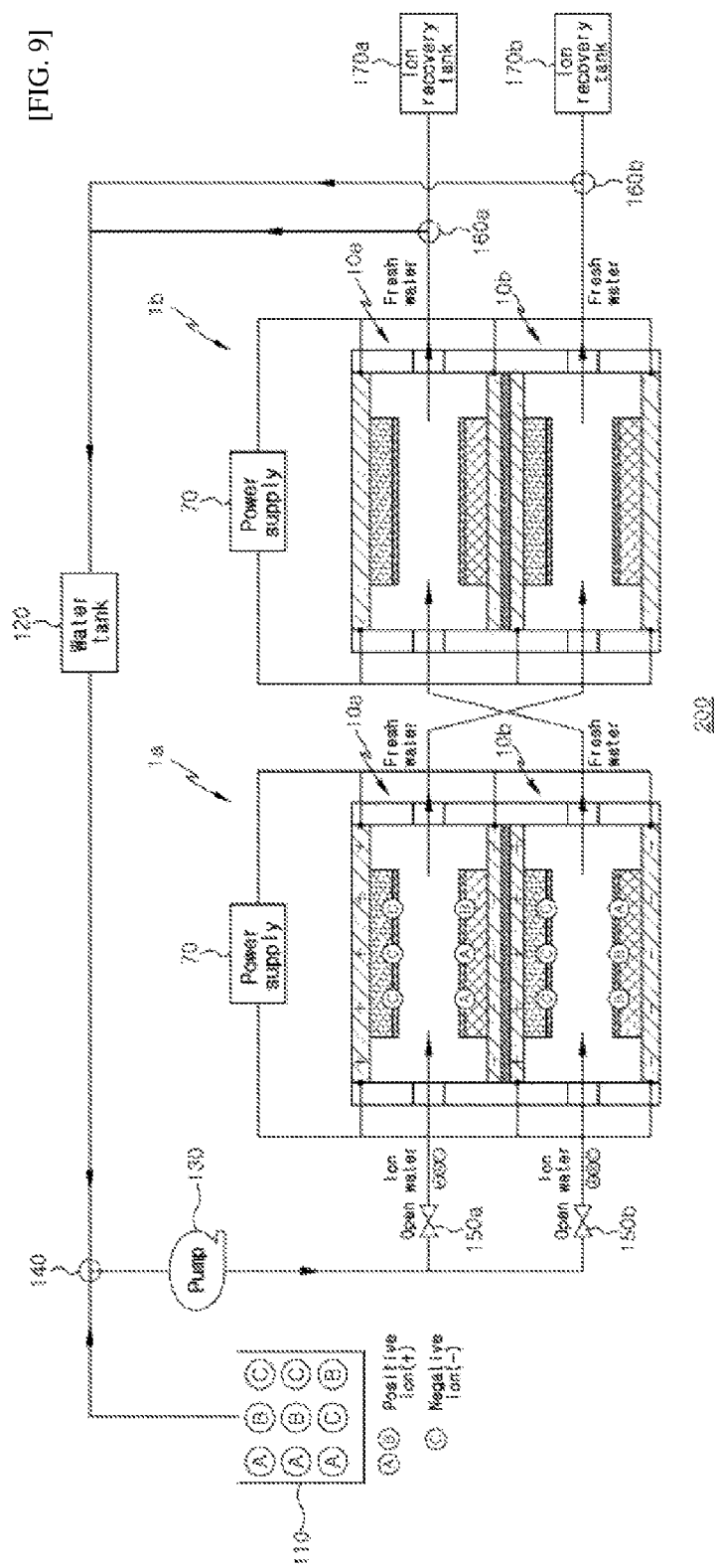
[FIG. 9]

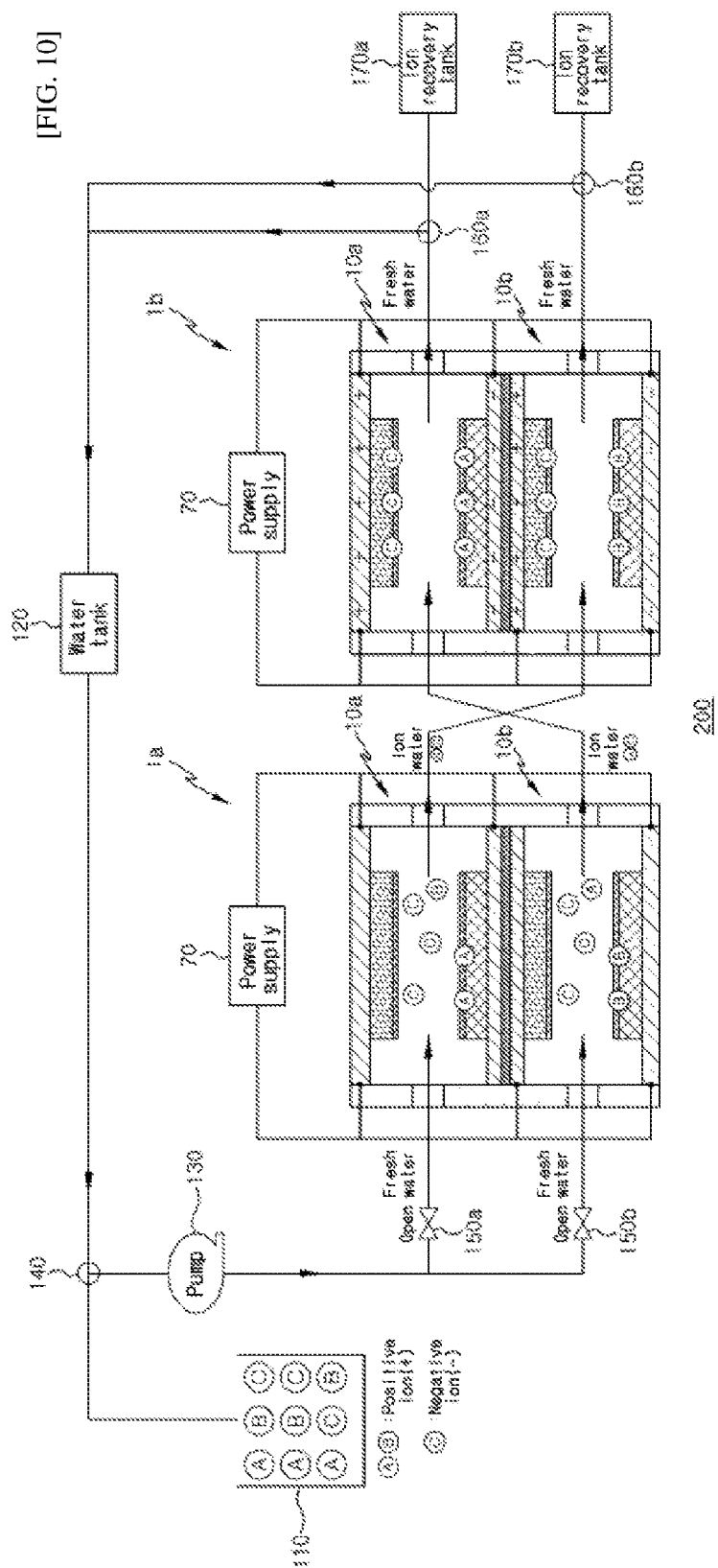

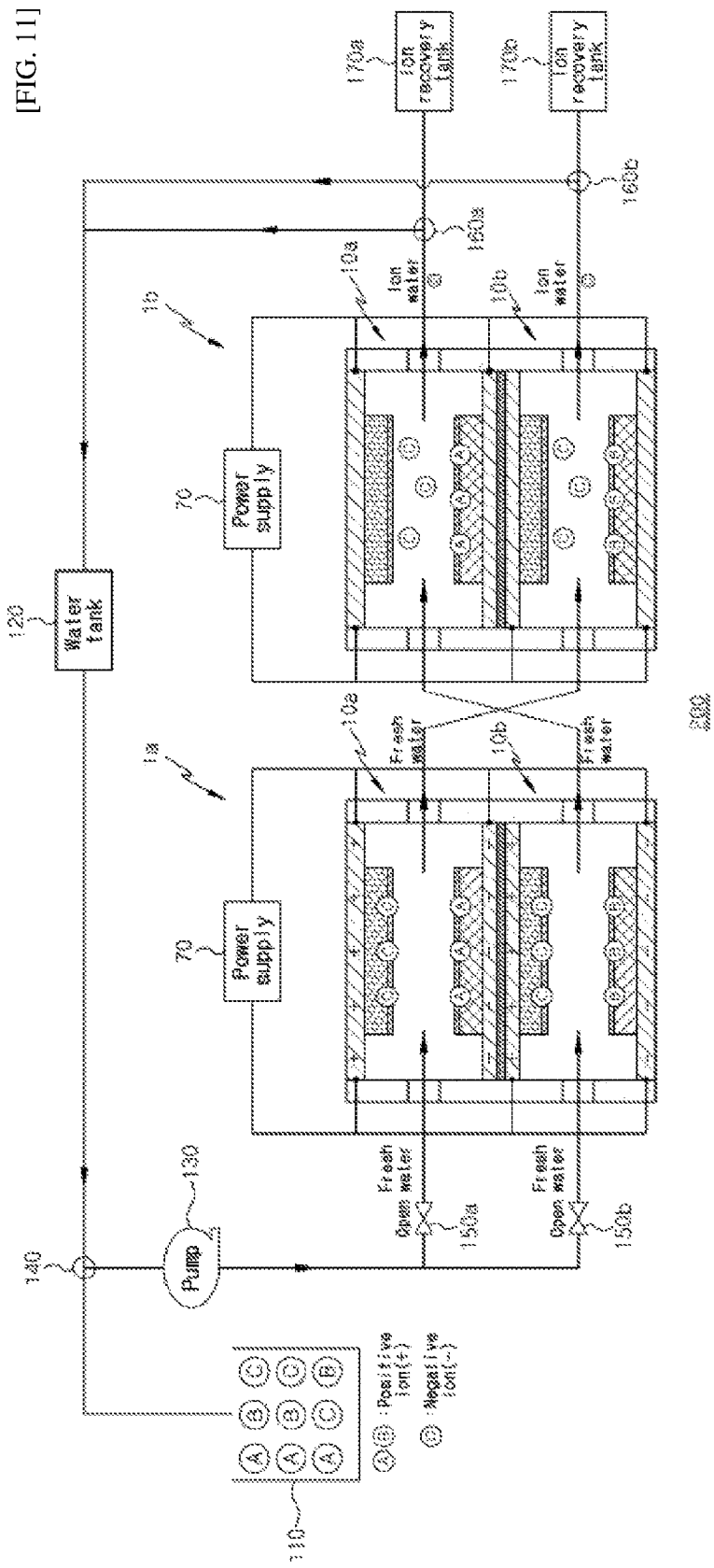
[FIG. 11]

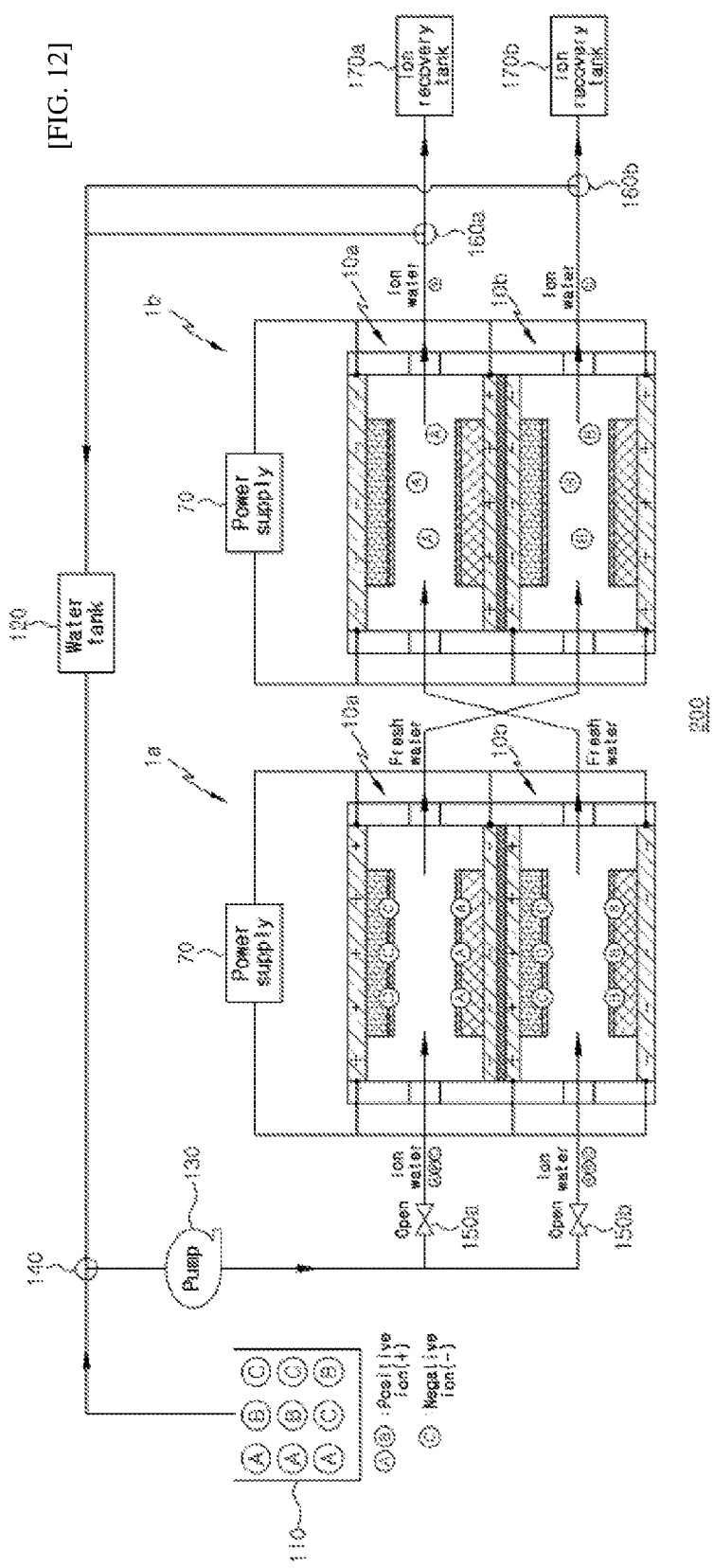

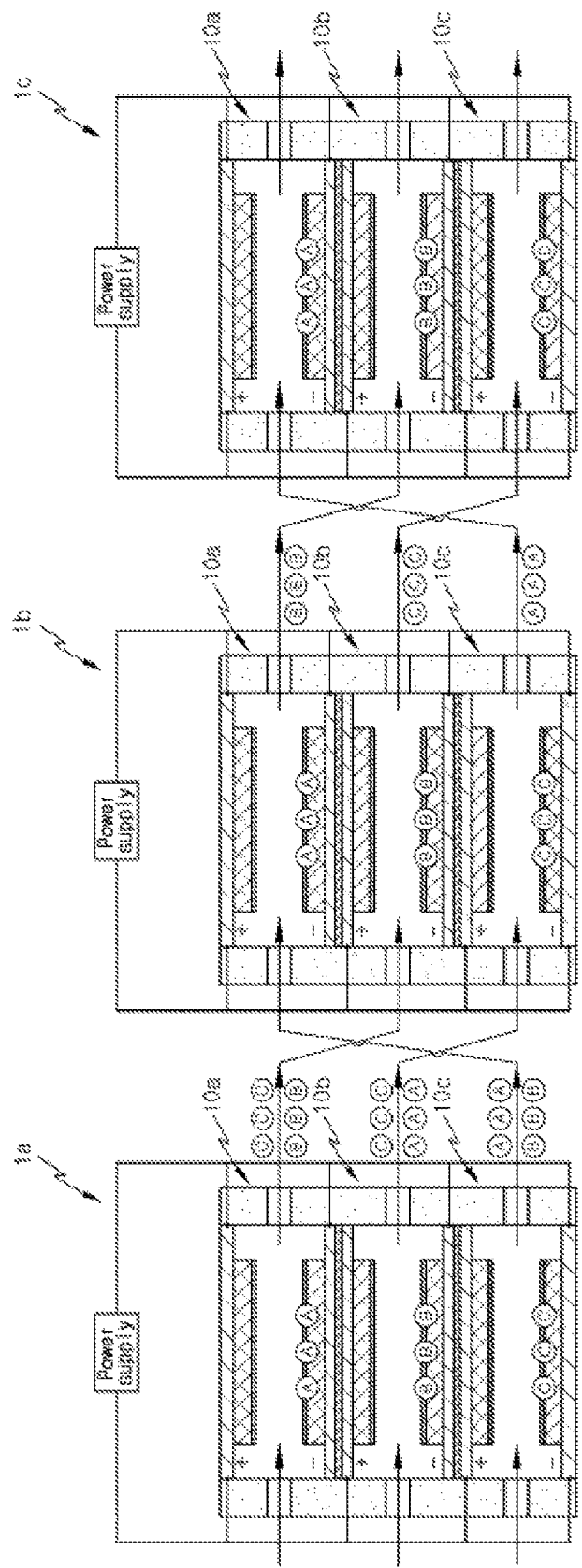
[FIG. 13]

[FIG. 14]
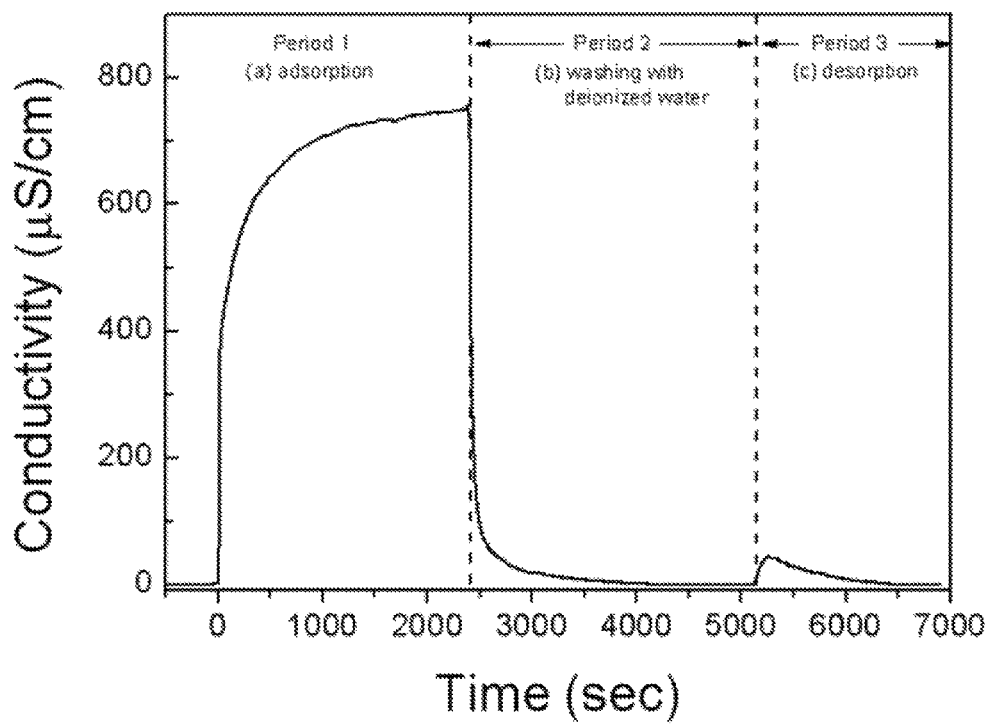

SYSTEM FOR RECOVERING MULTIPLE KINDS OF IONS

CROSS-REFERENCE TO RELATED APPLICATIONS

This application is based on and claims priority from Korean Patent Application No. 10-2015-0114333, filed on Aug. 13, 2015, with the Korean Intellectual Property Office, the disclosure of which is incorporated herein in its entirety by reference.

TECHNICAL FIELD

The present disclosure relates to a system for recovering multiple kinds of ions. More particularly, the present disclosure relates to a system for recovering multiple kinds of ions for selectively recovering specific multiple kinds of valuable metal ions from an aqueous solution such as seawater containing various ions through a series of processes.

BACKGROUND

The problem of exhaustion of valuable metal mineral resources that has been recently issued is expected to be an obstacle to development of human civilization in near future.

For example, strontium is a resource that has been generally used throughout the chemical and ceramic industry, but Korea has no mine and depends on imports for the whole quantity of strontium. Further, the amount of strontium deposits estimated around the world is not much, so the reserves-to-production ratio of strontium is expected as 10 to 30 years, even considering price rises, so the possibility of exhaustion of strontium is estimated as being very high.

However, the content of strontium in the seawater has been found as about 8 mg/L and the strontium deposits in the seawater has been found as being almost infinite, considering the content and the total amount of the seawater. Accordingly, many countries, including Korea, have made great efforts to develop a technique for extracting strontium from the seawater, and recently, some of the techniques have achieved the expected results for extracting strontium.

Further, lithium that is a mineral resource is the raw material of not only various IT products or electronic products such as a mobile phone, a notebook, and a camcorder, which occupy a large portion of the economic development of Korea, but the secondary battery necessary for hybrid electric vehicles, and is also national strategic metal used for special alloys for aircrafts and the fuel for nuclear fusion power generation.

Considering the economical efficiency of lithium that is a mineral resource, the amount of lithium mined from the ground around the world is at most about 4,100,100 tons and lithium is a rare resource expected to be exhausted within ten years later.

In order to recover lithium from the nature in the related art, there are a method of recovering it from minerals through roasting or exudation using sulfuric acid, a method of recovering it from naturally vaporizing salt lakes, and a method of extracting it from the seawater.

However, the lithium resource is limited in some countries and it is practically impossible to apply the method of obtaining lithium from minerals and salt lakes to Korea having little lithium deposits. However, it has been known that the content of lithium in dissolved resources in the seawater is very small as 0.17 mg/l, but the entire dissolved amount is very large as 2,300 hundred million tons.

As described above, a great amount of dissolved resources necessary for keeping the modern human life are contained in the seawater. Accordingly, a technology of recovering minerals that can selectively extract specific valuable metal ions dissolved in the seawater reduces the degree of dependency on foreign country resources and allows for stable supply of resources, so it has a sufficient value as an economic growth driver of Korea and is a very important technology for keeping developing the economy in the future.

Most techniques related to recovery of valuable metal from the seawater in the related art have been developed with a focus on exchange and adsorption of ions of inorganic or organic substances for selectively removing specific metal ions.

However, the techniques of recovering ions from the seawater in the related art was designed to recover only a specific kind of ion in the seawater and can recover only a specific kind of ion from mother liquor such as the seawater containing various kinds of ions, so it is not efficient, and a plurality of specific systems for recovering each of ions are specifically required to separately adsorb and recover various ions using the conventional system, so it is not economical.

Further, according to the techniques of recovering ions in the related art, a plurality of apparatuses is arranged in series to increase the efficiency of recovering single specific ion. Therefore, according to these techniques of recovering ions having this configuration in the related art, deionized water (cleansing water) supplied to remove non-adsorbed ions is discharged, so when the amount of the deionized water is insufficient, the deionized water to be supplied for the process of recovering the desired ions is not sufficiently supplied, so the recovery efficiency is reduced. Further, when ions are recovered from cells that have undergone the adsorption process, the whole systems connected in series should be stopped, so the efficiency of operation is also largely decreased.

SUMMARY

The present disclosure has been made in an effort to provide a system for recovering multiple kinds of ions, which can recover various kinds of ions using a single system, can sufficiently supply deionized water (cleansing water) for recovering or cleansing ions, and can provide high operation efficiency by keeping an ion adsorption process at another channel even if an ion recovery process is performed at a channel where an adsorption process has been finished.

An exemplary embodiment of the present disclosure provides a system for recovering multiple kinds of ions, which includes: an ion adsorption tank that includes a plurality of adsorption channels arranged in parallel and including a first electrode unit electrically adsorbing only negative ions and a second electrode unit having an adsorbent layer for adsorbing positive ions to be recovered from positive ions, in which electricity is independently supplied to the adsorption channels; a water tank that keeps liquid discharged from the ion adsorption tank; a pump that circulates a mother liquor containing ions or liquid stored in the water tank; and an ion recovering tank that keeps liquid containing positive ions to be recovered, through the ion adsorption tank.

Different kinds of adsorbent layers are formed at the second electrode units that are included in the plurality of adsorption channels, respectively.

The number of the adsorption channels that are included in the ion adsorption tank is the same as or more than the number of kinds of ions to be recovered.

A plurality of ion adsorption tanks is provided and connected to each other front and back and the number of the plurality of ion adsorption tanks is the same as the number of the kinds of ions to be recovered.

Liquid passing through the rear ion adsorption tank flows into another adsorption channel that the liquid has not passed through in the front ion adsorption tank.

The ion adsorption tank includes: a nonconductor electrically insulating the plurality of adsorption channels; and a power supply applying electricity independently to the adsorption channels.

The first electrode unit includes a collecting plate where electricity is applied, a porous carbon electrode coated on the collecting plate, and a negative ion exchange film attached to the porous carbon electrode, the second electrode unit includes a collecting plate where electricity is applied, an adsorbent layer coated on the collecting plate, and a positive ion exchange film attached to the adsorbent layer, and the positive ion exchange film and the negative ion exchange film face each other.

The adsorbent layer is made from a mixture of adsorbent powder for adsorbing specific positive ions and active carbon, or is formed in a double layer structure composed of adsorbent powder and active carbon.

According to the present disclosure, it is possible to recover various ions using a single system, and it is possible to supply a sufficient amount of deionized water (cleansing water) for removing ions and prevent environment contamination by not discharging, but reusing the water.

Further, even if an ion recovering process is performed in the channel that has finished a process of adsorbing ions to be recovered, the work in other channels can be maintained independently and ion adsorption processes can be continuously performed, so operation efficiency of the system is high.

BRIEF DESCRIPTION OF THE DRAWINGS

FIG. 1 is a schematic diagram of an ion adsorption tank that is included in a system for recovering multiple kinds of ions according to the present disclosure.

FIGS. 2 to 4 are diagrams illustrating ion adsorbing, cleansing, and ion recovering processes at an adsorption channel of the ion adsorption tank.

FIGS. 5 to 8 are diagrams illustrating a process of adsorbing and recovering ions using a system for recovering multiple kinds of ions according to a first embodiment of the present disclosure.

FIGS. 9 to 12 are diagrams illustrating a process of adsorbing and recovering ions using a system for recovering multiple kinds of ions according to a second embodiment of the present disclosure.

FIG. 13 is a schematic diagram illustrating an ion adsorption process in a system for recovering multiple kinds of ions of the present disclosure including three ion adsorption tanks.

FIG. 14 is a graph showing an ion conductivity change in water discharged in adsorbing, cleansing, and attaching/detaching desired ions at an adsorption channel in the system for recovering multiple kinds of ions according to the present disclosure.

DETAILED DESCRIPTION

Hereinafter, embodiments of the present disclosure will be described in detail with reference to the accompanying drawings. First, in the specification, in giving reference numerals to components throughout the drawings, it should be noted that like reference numerals designate like components even though the components are shown in different drawings. Further, when it is determined that a configuration may make the spirit of the present disclosure unclear, the detailed description is not provided. Further, although exemplary embodiments of the present disclosure will be described hereafter, the spirit of the present disclosure is not limited thereto and may be implemented by those skilled in the art.

FIG. 1 is a schematic diagram of an ion adsorption tank included in a system for recovering multiple kinds of ions according to the present disclosure, FIGS. 2 to 4 are diagrams illustrating ion adsorption, cleansing, and ion recovery processes at an adsorption channel constituting the ion adsorption tank, and FIGS. 5 to 8 are diagrams illustrating a process of adsorbing and recovering ions using a system for recovering multiple kinds of ions according to a first embodiment of the present disclosure.

Hereinafter, a system 100 for recovering multiple kinds of ions according to a first embodiment of the present disclosure is described with reference to FIGS. 1 to 8.

The system 100 for recovering multiple kinds of ions according to the first embodiment of the present disclosure includes one ion adsorption tank 1, a mother liquor tank 110, a water tank 120, a pump 130, an intake valve 140, a shut-off valve 150, an exhaust valve 160, and a ion recovery tank 170.

The ion adsorption tank 1 electrically adsorbs and separates ions included in a mother liquid such as seawater so that specific positive ions can be recovered.

The mother liquor tank 110 keeps mother liquor such as the seawater containing a large amount of ions.

The water tank 120 keeps cleansing liquid for removing undesired ions not adsorbed by the ion adsorption tank 1 or liquid discharged from the ion adsorption tank 1.

The pump 130 circulates the mother liquor containing ions kept in the mother liquor tank 110 or the liquid kept in the water tank 120.

The ion recovery tank 170 keeps the liquid containing positive ions to be recovered through the adsorbing, cleansing, and recovering processes in the ion adsorption tank 1.

The intake valve 140, the shut-off valve 150, and the exhaust valve 160 change or open/close the channels between the ion adsorption tank 1, the mother liquor tank 110, the water tank 120, and the ion recovery tank 170.

In detail, the ion adsorption tank 1 includes a plurality of adsorption channels 10 arranged in parallel and including a first electrode unit 20 electrically adsorbing only negative ions and a second electrode unit 30 having an adsorbent layer 34 for adsorbing positive ions to be recovered from positive ions, and electricity is independently supplied to the adsorption channels 10.

In detail, in the ion adsorption tank 1, as shown in FIG. 1, a plurality of adsorption channels 10 is arranged in parallel and a nonconductor 50 electrically insulating the adsorption channels 10 is disposed between the adsorption channels 10.

The adsorption channels 10 insulated by the nonconductors 50 and forming independent channels are mechanically connected inside a housing 60 having an inlet 62 and an outlet 64 at the inlets and outlets of the channels.

Further, electricity can be independently applied to the adsorption channels 10 so that processes can be performed independently from other adsorption channels 10, and to this end, the ion adsorption tank 1 includes a power supply 70.

The power supply 70 may be a multi-channel power supply that can independently apply electricity to the adsorption channels 10.

The adsorption channels 10 each make a channel that liquid passes through and electrically adsorb or separate ions included in the passing liquid so that only the positive ions to be recovered such as valuable metal ions can be selectively recovered.

In detail, the first electrode unit 20 of the adsorption channel 10 has a collecting plate 22 where electricity is applied, a porous carbon electrode 24 coated on the collecting plate 22, and a negative ion exchange film 26 attached to the porous carbon electrode 24.

Further, the second electrode unit 30 has a collecting plate 32 where electricity is applied, an adsorbent layer 34 coated on the collecting plate 32, and a positive ion exchange film 36 attached to the adsorbent layer 34.

The negative ion exchange film 26 and the positive ion exchange film 36 of the first electrode unit 20 and the second electrode unit 30 face each other and a liquid-passing layer 40, which electrically insulates the first electrode unit 20 and the second electrode unit 30 and passes liquid, is defined between the first electrode unit 20 and the second electrode unit 30.

The adsorbent layer 34 may be made from a mixture of adsorbent powder for adsorbing positive ions to be recovered and active carbon, or may be formed in a double layer structure composed of adsorbent powder and active carbon.

The liquid-passing layer 40 can be made of any substances as long as they can make a gap between the electrode units 20 and 30 and pass a solution containing ions, for example, non-woven fabric made of nylon having the size of 30 to 300 meshes.

FIGS. 2 to 4 are diagrams illustrating ion adsorbing, cleansing, and ion recovering processes at an adsorption channel constituting the ion adsorption tank.

Hereinafter, a process of adsorbing and recovering positive ions to be recovered by one adsorption channel 10 is described with reference to FIGS. 2 to 4. It is assumed in the following description that the positive ions to be recovered are strontium ions ($Sr^{2+}$).

—Adsorbing—

First, power is supplied to the electrode units 20 and 30 from the power supply 70, and as shown in FIG. 2, voltage is applied with the collecting plate 22 of the first electrode unit 20 as an anode (+) and the collecting plate 32 of the second electrode unit 30 as a cathode (−).

Thereafter, a solution such as the seawater dissolved with valuable metal ions is put into the liquid-passing layer 40 between the first electrode unit 20 and the second electrode unit 30, and accordingly, positive ions and negative ions of the electrolyte dissolved in the solution are moved to the collecting plates 22 and 32 charged with opposite polarities by electrostatic attraction.

The positive ions moved to the second electrode unit 30 are adsorbed to the adsorbent layer 34 has high selectivity for specific ions through the positive ion exchange film 36, that is, strontium ions are adsorbed to the adsorbent layer 34 made of zeolite having high selective adsorption for strontium in this case.

—Cleansing—

Next, as shown in FIG. 3, when the voltage at the first electrode unit 20 and the second electrode unit 30 is dropped to 0 V or the electrodes are discharged, the electrostatic attraction of the adsorption channel 10 is removed, so the ions moved to the electrode units 20 and 30 are diffused into cleansing water such as deionized water (fresh water) flowing into the adsorption channel 10 and the fluid diffused with the ions is discharged from the adsorption channel 10.

The positive ions to be recovered, which has been adsorbed to the adsorbent layer 34 of the second electrode unit 30, the strontium ions keep fixed to the adsorbent layer 34 and are not diffused into liquid, so they are separated from other positive ions.

—Recovering—

Finally, as shown in FIG. 4, voltage is applied by operating the power supply 70 with the collecting plate 22 of the first electrode unit 20 as a cathode (−) and the collecting plate 32 of the second electrode unit 30 as an anode (+), opposite to FIG. 2, and then fresh water is supplied.

Accordingly, the strontium ions fixed to the adsorbent layer 34 are moved toward the first electrode unit 20 by electrostatic attraction, and then, separated into the fresh water from the adsorbent layer 34.

The strontium ions discharged into the fresh water cannot move into the first electrode unit 20 by the negative ion exchange film 26 that can selectively pass only negative ions, and similarly, the negative ions discharged into the fresh water from the first electrode unit 20 cannot move into the second electrode unit 30 by the positive ion exchange film 36. Accordingly, the ions discharged into the fresh water do not move back into the electrodes units 20 and 30, but are recovered after being diffused into liquid and then discharged outside.

As described above, the ion exchange films 26 and 36 make it possible to suppress reduction of efficiency of the adsorption channel 10 due to accumulation of ions.

The system 100 for recovering multiple kinds of ions according to the first embodiment of the present disclosure includes a plurality of adsorption channels 10 to be able to recover various ions by independently supplying electricity to the adsorption channels 10.

In detail, the number of the adsorption channels 10 disposed in the ion adsorption tank 1 to recover various ions through a series of processes may be the same as or more than the number of the kinds of ions to be recovered. For example, when two kinds of ions are supposed to be recovered, at least two or more adsorption channels 10 are provided to the ion adsorption tank 1.

Further, different kinds of adsorbent layers 34 are formed at the second electrode unit 30 disposed in each of the plurality of adsorption channels 10 in accordance with the components of ions to be adsorbed and recovered.

For example, when strontium ion ($Sr^{2+}$) and lithium ion ($Li^+$) are positive ions to be recovered, the adsorbent layer 34 for adsorbing the strontium ion may be made of a substance including zeolite that can absorb strontium and the adsorbent layer 34 for adsorbing the lithium ion may be made of a substance including lithium manganese oxide.

Hereinafter, processes of adsorbing, cleansing, and recovering various ions by the system 100 for recovering multiple kinds of ions according to the first embodiment of the present disclosure are described with reference to FIGS. 5 to 8.

In this case, it is assumed that two kinds of positive ions A and B are supposed to be recovered and C means a negative ion.

Since two kinds of positive ions are supposed to be recovered, two adsorption channels 10 are provided to the ion adsorption tank 1, but adsorption channels 10 more than the number of kinds of ions to be recovered may be used.

FIG. 5 shows a process of adsorbing positive ions A and B to be recovered, using the system 100 for recovering multiple kinds of ions according to the first embodiment of the present disclosure.

In detail, first, the power supply 70 supplies independently power to the adsorption channels 10. Since the process is supposed to adsorb positive ions to the second electrode units 30, the first electrode units 20 and the second electrode units 30 of the adsorption channels 10a and 10b are charged with an anode (+) and a cathode (−), respectively.

Thereafter, the pump 130 pumps up a solution containing various ions kept in the mother liquor tank 110 or the water tank 120 to the ion adsorption tank 1.

The intake valve 140 disposed in the channel connected to the ion adsorption tank 1 between the mother liquor tank 110 and the water tank 120 is a 3-way valve and the channel is adjusted by the intake valve 140 so that the solution containing ions kept in any one of the mother liquor tank 110 and the water tank 120 can flow into the ion adsorption tank 1.

Further, the shut-off valves 150a and 150b disposed between the intake valve 140 and the ion adsorption tank 1, that is, at the front ends of the adsorption channels 10a and 10b are opened so that mother liquor containing ions can flow into the adsorption channels 10a and 10b.

As the mother liquor flowing into the adsorption channels 10a and 10b passes through the adsorption channel 10, the ions A, B, and C included in the mother liquor are moved to the first electrode unit 20 or the second electrode unit 30 by electric attraction. In other words, the positive ions A and B in the mother liquor are moved to the second electrode unit 30 changed with a cathode and the negative ions C are moved to the first electrode unit 20 charged with an anode.

As described above, as the ions are adsorbed to the electrode units 20 and 30, the mother liquor containing the ions is deionized and discharged to the outlet 64 and the fresh water discharged from the ion adsorption tank 1 through the ion adsorption process is sent to the water tank 120 by the exhaust valve 160.

Exhaust valves 160a and 160b are disposed at the rear ends of the adsorption channels 10a and 10b, respectively, and the exhaust valve 160 changes the channel to send the solution discharged from the ion adsorption tank 1 to the water tank 120 or the ion recovery tank 170.

FIG. 6 shows a cleansing process for removing the ions not adsorbed to the adsorbent layer 34 after the ion adsorption process of FIG. 5 from the adsorption channels 10.

In the cleansing process, the power supply 70 stops supplying power to the adsorption channels 10a and 10b, so the electric field in the ion adsorption tank 1 is removed.

Fresh water discharged from the ion adsorption tanks 10a and 10b in the previous adsorbing process is kept in the water tank 120 and is sent to the adsorption channels 10a and 10b of the ion adsorption tank 1 by the pump 130.

The intake valve 140 opens the channel to the water tank 120 and closes the channel to the mother liquor tank 110 so that only the fresh water in the water tank 120 flows into the ion adsorption tank 1. Further, the shut-off valves 150a and 150b keep open.

When the fresh water passes through the adsorption channels 10a and 10b, the ions not adsorbed of the ions moved to the electrode units 20 and 30 are diffused to the fresh water flowing into the adsorption channel 10 and the liquid diffused with the ions is discharged together with the ions from the adsorption channel 10.

The positive ions A and B to be recovered, which has been adsorbed to the adsorbent layer 34 of the second electrode unit 30 keep fixed to the adsorbent layer 34, so they are not diffused back into the liquid.

The solution discharged after cleansing the adsorption channels 10a and 10b is sent to the water tank 120.

FIG. 7 shows a pre-process for recovering ions from the first adsorption channel 10a adsorbing first the ions A.

It is required to supply fresh water to recover the ions adsorbed to the adsorption channels 10a and 10b. However, since ions are contained in the solution sent to and kept in the water tank 120 in the previous cleansing process, it is required to deionize the solution by sending it through the ion adsorption tank 1.

To this end, in the pre-process for recovering ions shown in FIG. 7, the first adsorption channel 10a is stopped by closing the shut-off valve 150a for opening/closing the first adsorption channel 10a and the solution containing ions in the water tank 120 is sent to the second adsorption channel 10b, thereby performing the adsorbing process.

The fresh water discharged from the second adsorption channel 10b is sent back to the water tank 120 to be use in the ion recovery process later.

FIG. 8 shows a recovering process for recovering the ions A by supplying fresh water to the first adsorption channel 10a adsorbing the ions A.

When the water tank 120 is filled with the fresh water in the pre-process shown in FIG. 7, the intake valve 140 and the shut-off valve 150a are opened so that the fresh water flows into the first adsorption channel 10a.

In this process, the first electrode unit 20 of the first adsorption channel 10a is charged with a cathode (−) and the second electrode unit 30 is charged with an anode (+) by the power supply 70, so the positive ions A adsorbed to the adsorbent layer 34 is separated from the adsorbent layer 34.

The separated ions A flows to the fresh water and is discharged out of the ion adsorption tank 1, in which the exhaust valve 160a switches the channel to the ion recovery tank 170a so that the solution containing the ions A is sent to the ion recovery tank 170a.

In this process, the second adsorption channel 10b can perform again the cleansing process with fresh water, and if necessary, it may be stopped by closing the shut-off valve 150b at the front end.

Thereafter, by performing a process of recovering the ions B in the second adsorption channel 10b, so one system can continuously recover various ions.

The method of opening/closing or switching the channels for adsorbing and recovering ions and the method of setting the polarities of the electrodes units 20 and 30 of the adsorption channels 10a and 10b in the system 100 for recovering multiple kinds of ions according to the first embodiment of the present disclosure are not limited thereto and may be freely determined by users.

FIGS. 9 to 12 are diagrams illustrating a process of adsorbing and recovering ions using a system for recovering multiple kinds of ions according to a second embodiment of the present disclosure.

Hereinafter, a system 200 for recovering multiple kinds of ions according to a second embodiment of the present disclosure is described with reference to FIGS. 9 to 12.

The system 200 for recovering multiple kinds of ions according to the second embodiment of the present disclosure is the same as the system of the first embodiment, except that a plurality of ion adsorption tanks 1 is provided.

In detail, the system 200 for recovering multiple kinds of ions according to the second embodiment of the present disclosure includes a plurality of ion adsorption tanks 1a and 1b arranged front and back and connected to each other. The number of the ion adsorption tanks 1 is the same as or more than the number of the kinds of ions to be recovered.

Liquid passing through the ion adsorption tank 1a ahead and then flowing into the ion adsorption tank 1b behind, of the ion adsorption tanks 1a and 1b connected to each other, flows to another adsorption channel 10 that the liquid has not passed through in the previous ion adsorption tank 1a.

For example, the liquid discharged from the first adsorption channel 10a of the front ion adsorption tank 1a flows into the second adsorption channel 10b of the rear ion adsorption tank 1b, and similarly, the liquid discharged from the second adsorption channel 10b of the front ion adsorption tank 1a flows into the first adsorption channel 10a of the rear ion adsorption tank 1b.

The ion adsorption tanks 1a and 1b have the same configuration. That is, an adsorbent layer 34 formed in the first adsorption channel 10a of the front ion adsorption tank 1a is the same as an adsorbent layer 34 formed in the first adsorption channel 10a of the rear ion adsorption tank 1b, and the adsorbent layers 34 formed in the second adsorption channels 10b of the front and rear ion adsorption tanks 1a and 1b also have the same configuration.

Since a plurality of ion adsorption tanks 1a and 1b is provided, as described above, it is possible to more efficiently adsorb and recover various ions to be recovered.

In FIGS. 9 to 12, it is assumed that two kinds of positive ions A and B are supposed to be recovered and C means a negative ion.

Since two kinds of positive ions are supposed to be recovered, two adsorption channels 10 are provided to the ion adsorption tank 1 and two adsorption channels 10 are provided in the entire system, but adsorption channels 10 and the ion adsorption tanks 1 more than the number of kinds of ions to be recovered may be used.

FIG. 9 shows an adsorbing process performed in the front ion adsorption tank 1a.

When the systems 100 and 200 for recovering multiple kinds of ions of the present disclosure are operated, the mother liquor containing ions kept in the mother liquor tank 110 or the water tank 120 flows into the front ion adsorption tank 1a, thereby performing the ion adsorption process.

In detail, first, the power supply 70 for the front ion adsorption tank 1a supplies independently power to the adsorption channels 10a and 10b. Since the process is supposed to adsorb positive ions to the second electrode units 30, the first electrode units 20 and the second electrode units 30 of the adsorption channels 10a and 10b are charged with an anode (+) and a cathode (−), respectively.

Thereafter, the pump 130 pumps up a solution containing various ions kept in the mother liquor tank 110 or the water tank 120 to the front ion adsorption tank 1a.

The intake valve 140 adjusts the channel so that the solution containing ions kept in any one of the mother liquor tank 110 and the water tank 120 can flow into the front ion adsorption tank 1a.

Further, the shut-off valves 150a and 150b are opened so that the mother liquor containing ions can flow into the adsorption channels 10a and 10b of the front ion adsorption tank 1a.

As the mother liquor flowing into the adsorption channels 10a and 10b passes through the adsorption channel 10, the ions A, B, and C included in the mother liquor are moved to the first electrode unit 20 or the second electrode unit 30 by electric attraction.

As described above, as the ions are adsorbed to the electrode units 20 and 30, the mother liquor containing the ions is deionized and discharged with the ion removed to the outlet 64 and the fresh water discharged from the front ion adsorption tank 1a through the ion adsorption process in the front adsorption tank 1a is sent to the rear ion adsorption tank 1b.

The liquid discharged from the first adsorption channel 10a of the front ion adsorption tank 1a flows into the second adsorption channel 10b of the rear ion adsorption tank 1b, and similarly, the liquid discharged from the second adsorption channel 10b of the front ion adsorption tank 1a flows into the first adsorption channel 10a of the rear ion adsorption tank 1b.

The channels between the adsorption channels 10a and 10b of the front and rear ion adsorption tanks 1a and 1b are maintained in the same way in all of the following processes.

The rear ion adsorption tank 1b is stopped by stopping power supplying, as shown in FIG. 9, so that the fresh water passing through the rear ion adsorption tank 1b can be sent to the water tank 120. However, the initial operation state is assumed in FIG. 9, so if necessary, the rear ion adsorption tank 1b can also perform an adsorption process, similar to the front ion adsorption tank 1a, so that fresh water can be sent to the water tank 120.

FIG. 10 shows an adsorbing process in the rear ion adsorption tank 1b after the process shown in FIG. 9.

Fresh water is kept in the water tank 120 through the process shown in FIG. 9 and the fresh water kept in the water tank 120 flows into the front ion adsorption tank 1a. Power is not supplied to the front ion adsorption tank 1a, and while a cleansing process is performed, other ions except for the positive ions A and B adsorbed to the adsorbent layers 34 of the adsorption channels 10a and 10b are sent to the fresh water and discharged to the rear ion adsorption tank 1b.

Positive ions including the ions B and negative ions are contained in the solution discharged from the first adsorption channel 10a of the front ion adsorption tank 1a and the solution flows into the second adsorption channel 10b of the rear ion adsorption tank 1b.

Electricity is applied to the rear ion adsorption tank 1b to perform adsorbing process and the second adsorption channel 10b of the rear ion adsorption tank 1b adsorbs ions B from the solution discharged from the front ion adsorption tank 1a.

Similarly, positive ions including the ions A and negative ions are contained in the solution discharged from the second adsorption channel 10b of the front ion adsorption tank 1a and the solution flows into the first adsorption channel 10b of the rear ion adsorption tank 1b, so that the ions A in the solution discharged from the front ion adsorption tank 1a are adsorbed.

The solution discharged after the adsorbing process in the rear ion adsorption tank 1b is deionized and sent back to the water tank.

Accordingly, it is possible to more efficiently adsorb ions to be recovered from the solution discharged from the front ion adsorption tank 1a through the adsorbing process in the rear ion adsorption tank 1b and it is possible to increase the efficiency of adsorbing various ions by crossing the channels between the adsorption channels 10a and 10b of the front and rear ion adsorption tanks 1a and 1b.

FIG. 11 illustrates a process of removing unnecessary ions before recovering ions adsorbed to the rear ion adsorption tank 1b.

It is required to remove the other ions except for the ions to be recovered in order to recover the ions adsorbed to the rear ion adsorption tank 1b.

Since fresh water is kept in the water tank 120 through the adsorbing process in the rear ion adsorption tank 1b, the fresh water in the water tank 120 is sent to the rear ion adsorption tank 1b through the front ion adsorption tank 1a to clean the rear ion adsorption tank 1b.

More pure fresh water can be supplied to the rear ion adsorption tank 1b by supplying power to the front ion adsorption tank 1a, as in the absorbing process. Alternately, since the front ion adsorption tank 1a has undergone the cleansing process in the previous process (see FIG. 10), it may be possible to stop the front ion adsorption tank 1a by cutting power so that the fresh water can flow into the rear ion adsorption tank 1b through it.

The fresh water flowing in the rear ion adsorption tank 1b cleans the adsorption channels 10a and 10b and discharged solution is sent to the water tank 120. Power for the rear ion adsorption tank 1b is also cut for the cleansing process as described above.

FIG. 12 illustrates a process of recovering ions to be recovered adsorbed to the rear ion adsorption tank 1b.

A solution containing ions is kept in the water tank 120 by the cleansing process in the rear ion adsorption tank 1b in FIG. 11 and the front ion adsorption tank 1a perform an adsorbing process to supply fresh water to the rear ion adsorption tank 1b.

The solution supplied to the front ion adsorption tank 1a, as shown in FIG. 12, may be the mother liquor kept in the mother liquor tank 110, and in some cases, it may be possible to send the solution kept in the water tank 120 to the front ion adsorption tank 1a.

The solution supplied to the front ion adsorption tank 1a performing the adsorbing process is deionized, sent into the rear ion adsorption tank 1b, and used for a recovering process. In the rear ion adsorption tank 1b, the positive ions A and B to be recovered adsorbed to the adsorbent layers 34 of the adsorption channels 10a and 10b are sent to the fresh water by applying an anode (+) to the second electrode units 30 of the adsorption channels 10a and 10b to recover ions.

The solution containing ions to be recovered discharged from the adsorption channels 10a and 10b of the rear ion adsorption tanks 1a and 1b are sent to and kept in the ion recovering tanks 170a and 170b, thereby finishing the ion recovering process in the rear ion adsorption tank 1b.

Though not shown in detail, the process of recovering ions to be recovered adsorbed to the front ion adsorption tank 1a can also be performed by supplying fresh water to the front ion adsorption tank 1a, in which the rear ion adsorption tank 1b keeps being removed with all ions to function as a channel through which the solution containing ions to be recovered flowing from the front ion adsorption tank 1a is sent to corresponding ion recovering tanks 170a and 170b.

Further, specific valves and ion recovering tanks 170a and 170b may be disposed at the rear ends of the adsorption channels 10a and 10b of the front ion adsorption tank 1a so that the solution discharged from the front ion adsorption tank 1a can be selectively sent to the rear ion adsorption tank 1b, the water tank 120, and the ion recovering tanks 170a and 170b in accordance with processes.

However, even in this case, the channels between the adsorption channels 10a and 10b of the front and rear ion adsorption tanks 1a and 1b are arranged to cross each other so that the liquid passing through the rear ion adsorption tank 1b can flow into another adsorption channel 10 that it has not passed through in the front ion adsorption tank 1a as shown in FIG. 12.

FIG. 13 is a schematic diagram illustrating an ion adsorption process in a system for recovering multiple kinds of ions of the present disclosure including three ion adsorption tanks.

A, B, and C are all positive ions to be recovered and negative ions are not shown.

In the system for recovering multiple kinds of ions of the present disclosure shown in FIG. 13, it is possible to connect and use three or more ion adsorption tanks 1a, 1b, and 1c.

In this system, similarly, the adsorption channels 10a, 10b, and 10c of the front and rear ion adsorption tanks 1a, 1b, and 1c are configured, as described above, such that the liquid passing through the rear ion adsorption channel 1a or 1c flows into another adsorption channel 10 that it has not passed through in the front ion adsorption tank 1a or 1b.

For example, as shown in FIG. 13, a mother liquor flowing in the first adsorption channel 10 of the most front ion adsorption tank 1a flows into the second adsorption channel 10b of the middle ion adsorption tank 1b with positive ions B and C to be recovered, after the ions A are adsorbed.

The second adsorption channel 10b of the middle ion adsorption tank 1b adsorbs the ions B from the solution, and the solution containing the ions C of the positive ions to be recovered flows into the third adsorption channel 10c of the most rear ion adsorption tank 1c and the ions C are adsorbed therein.

Accordingly, the solution that has undergone the adsorbing process in any one adsorption channel 10 of the front ion adsorption tank 1 and is then discharged with other ions to be recovered flows into the adsorbing process of the rear ion adsorption tank 1 performing an adsorbing process, so it is possible to continuously adsorb various ions to be recovered.

In the examples, only the process of adsorbing various positive ions to be recovered is simply described, and the channels between the ion adsorption tanks 1, the valves disposed in the channels, and the methods of supplying power may be changed in various ways.

FIG. 14 is a graph showing an ion conductivity change in water discharged in adsorbing, cleansing, and attaching/detaching desired ions at an adsorption channel disposed in the system for recovering multiple kinds of ions of the present disclosure.

The flow rate of water discharged from the adsorption channel 10 was 40 ml/min, the electric potential in an adsorbing process was 1.5 V, and the electric potential (reversed) in a recovering process was 3.5 V.

FIG. 14 shows that it is possible to sequentially adsorb and separate specific ions, and accordingly, it can be seen that it is possible to efficiently recover specific ions through a series of processes using the systems 100 and 200 for recovering multiple kinds of ions of the present disclosure.

As described above, according to the present disclosure, it is possible to recover various ions using the single systems 100 and 200, and it is possible to supply a sufficient amount of fresh water (cleansing water) for removing ions and prevent environment contamination by not discharging, but reusing the fresh water. Further, a series of processes make it possible to continuously recover ions, so the operation efficiency of the system can be maximized.

The above description is an example that explains the spirit of the present disclosure and may be changed, modified, and replaced in various ways without departing from the basic features of the present disclosure by those skilled in the art. Accordingly, the embodiment described herein and the accompanying drawings re provided not to limit, but to explain the spirit of the present disclosure and the spirit and the scope of the present disclosure are not limited by the embodiments and the accompanying drawings. The protective range of the present disclosure should be construed on the basis of claims and all the technical spirits in the equivalent range should be construed as being included in the scope of the right of the present disclosure.

What is claimed is:

1. A system for recovering multiple kinds of ions, the system comprising:
    an ion adsorption tank that includes a plurality of adsorption channels arranged in parallel and each of the plurality of adsorption channels including a first electrode unit electrically adsorbing only negative ions and a second electrode unit having an adsorbent layer having higher selectivity for adsorbing positive ions to be recovered from than other positive ions, in which electricity is independently supplied to the adsorption channels;
    a water tank that keeps liquid discharged from the ion adsorption tank;
    a pump that circulates mother liquor containing ions or liquid stored in the water tank; and
    an ion recovering tank that keeps liquid containing positive ions to be recovered, through the ion adsorption tank,
    wherein different kinds of adsorbent layers are formed at the second electrode units disposed in the plurality of adsorption channels and the number of the adsorption channels disposed in the ion adsorption tank is the same as or more than the number of kinds of ions to be recovered.

2. The system of claim 1, wherein a plurality of ion adsorption tanks is provided and connected to each other front and back and the number of the plurality of ion adsorption tanks is the same as the number of the kinds of ions to be recovered.

3. The system of claim 2, wherein liquid passing through the rear ion adsorption tank flows into another adsorption channel that the liquid has not passed through in the front ion adsorption tank.

4. The system of claim 1, wherein the ion adsorption tank includes: a nonconductor electrically insulating the plurality of adsorption channels; and a power supply applying electricity independently to the adsorption channels.

5. The system of claim 1, wherein the first electrode unit includes a collecting plate where electricity is applied, a porous carbon electrode coated on the collecting plate, and a negative ion exchange film attached to the porous carbon electrode,
    the second electrode unit includes a collecting plate where electricity is applied, an adsorbent layer coated on the collecting plate, and a positive ion exchange film attached to the adsorbent layer, and
    the positive ion exchange film and the negative ion exchange film face each other.

6. The system of claim 5, wherein the adsorbent layer is made from a mixture of adsorbent powder for adsorbing specific positive ions and active carbon, or is formed in a double layer structure composed of adsorbent powder and active carbon.

* * * * *